(No Model.)

W. S. KISINGER.
CLUTCH MECHANISM.

No. 423,431. Patented Mar. 18, 1890.

Attest.
H. G. Stuebel.
Arthur Moore.

Inventor.
William S. Kisinger.
by James H. Layman.
Atty.

UNITED STATES PATENT OFFICE.

WILLIAM S. KISINGER, OF BELLEVUE, KENTUCKY, ASSIGNOR TO HENRY G. STIEBEL, OF CINCINNATI, OHIO.

CLUTCH MECHANISM.

SPECIFICATION forming part of Letters Patent No. 423,431, dated March 18, 1890.

Application filed November 6, 1889. Serial No. 329,448. (No model.)

*To all whom it may concern:*

Be it known that I, WILLIAM S. KISINGER, a citizen of the United States, residing at Bellevue, in the county of Campbell and State of Kentucky, have invented certain new and useful Improvements in Clutch Mechanism; and I do hereby declare the following to be a full, clear, and exact description of the invention, reference being had to the annexed drawings, which form part of this specification.

The object of this invention is to throw a pair of sliding clutch-boxes in gear with their counterpart boxes by the simple movement of a single rock-shaft, which latter may be operated either by a treadle or hand-lever, or otherwise. Furthermore, the invention may be applied to various forms of machines, vehicles, agricultural implements, &c., as hereinafter more fully described.

Figure 1:
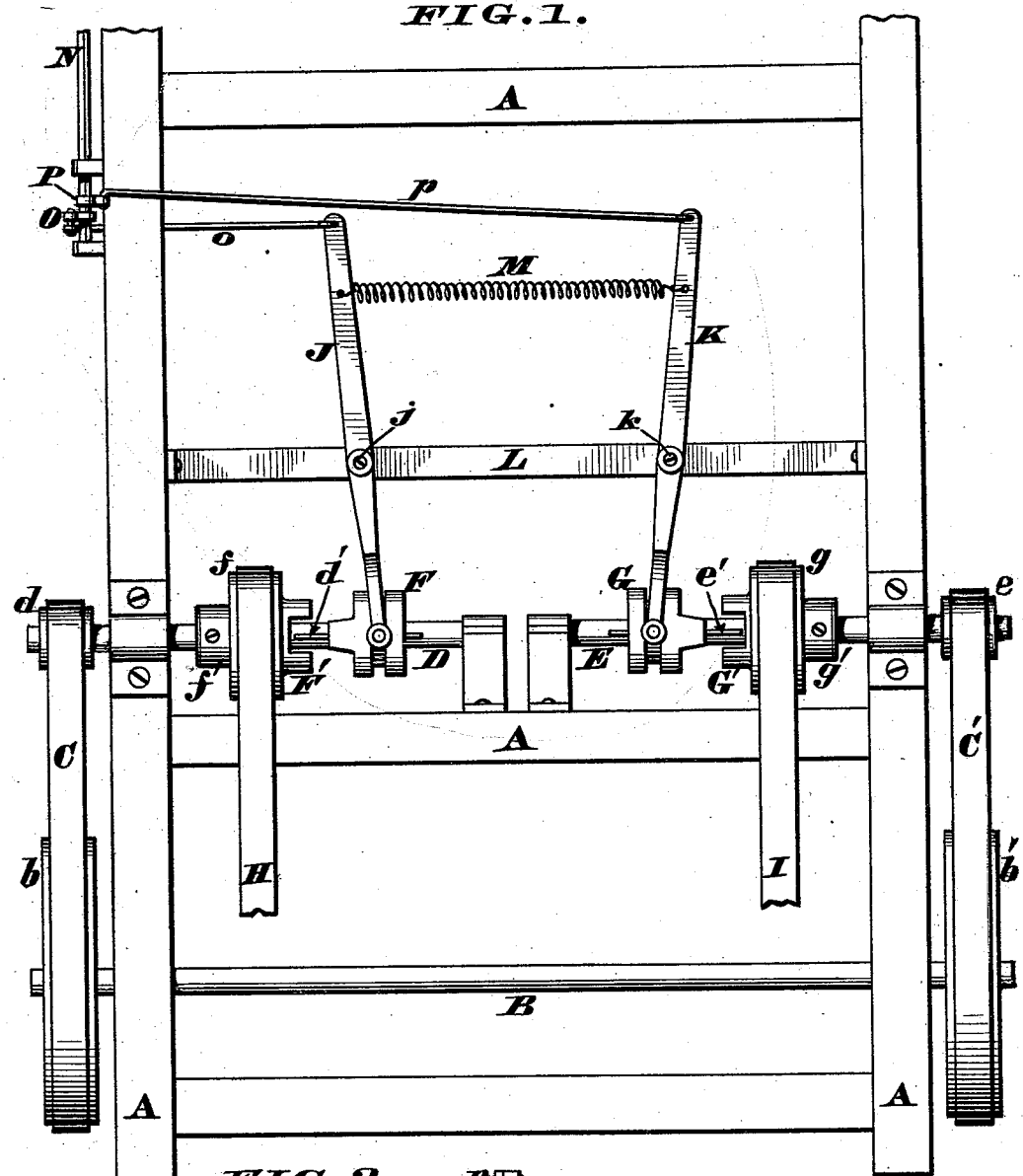
Figure 2:
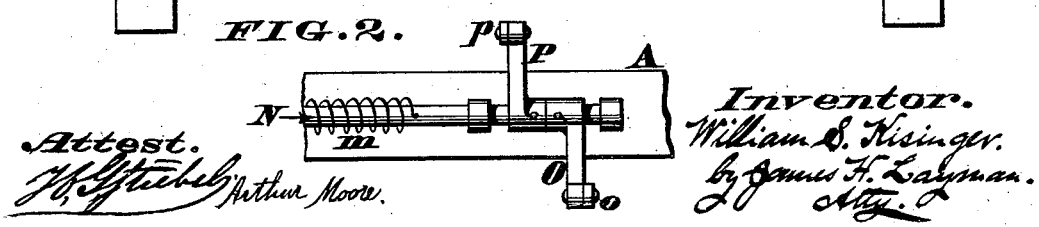

In the annexed drawings, Figure 1 is a plan of a frame with my clutch mechanism applied thereto, both clutch-boxes being retracted or disengaged from their counterpart boxes. Fig. 2 is an elevation of the rock-shaft and its accessories.

A represents the frame or carriage of any form of machine, or vehicle, or implement, which frame has a driving or main shaft B journaled in it. This shaft may constitute the axle of a vehicle, or it may be geared or otherwise coupled to an axle; but in either event it should have suitable provision for driving a pair of counter-shafts to which the shiftable clutches are applied. Said shaft B is accordingly shown as carrying pulleys b b', around which latter pass chains or belts C C', that drive small pulleys d e at the outer ends of counter-shafts D E. These counter-shafts are suitably journaled within the main frame, and have, respectively, feathers d' e', that insure a positive rotation of the clutch-boxes F G, while at the same time they permit said boxes to be advanced and retracted in the usual manner. F' G' are the customary counterparts of said boxes, which devices F' G' are usually integral hubs of pulleys f g, around which latter pass belts H I, that communicate motion from the counter-shafts to any desired appliance or instrumentality. It is evident, however, that spur or bevel gears may be substituted for these pulleys and belts.

f' and g' are collars secured to the respective counter-shafts, and serving, in connection with the feathers d' e', to prevent the pulleys f g shifting along said shafts, which pulleys are normally inactive until engaged with their respective clutches. These clutches are operated by levers J K, pivoted at j k to a fulcrum-bar L of the frame, said levers being constantly coupled together by a powerful pulling spring M, which is preferably a coiled spring; but the same result may be produced by coiling a spring m around the rock-shaft N, as seen in Fig. 2. One end of this rock-shaft has levers O P secured to it, from which levers rods o p run to the clutch-levers J K. The other end of this rock-shaft may be operated by any suitable instrumentality—such, for example, as a treadle, or hand-lever, or other appliance.

From the above description it is evident the drivers b b' impart a high velocity to the counter-shafts D E; but the motion of the latter cannot be communicated to the pulleys f g while the clutches F G are disposed as seen in Fig. 1, which position of said clutches is due to the fact that sufficient pressure has been exerted against the rock-shaft N to overcome the pull of spring M, and thereby swing the levers J K in the direction shown. To set the pulleys f g in motion, the attendant removes the pressure from the rock-shaft, and thus leaves the spring M at full liberty to exert its force, the result of which act is to advance the clutches F G and simultaneously throw them in gear with their respective counterparts F' G'. Consequently the pulleys f g are now locked to their respective shafts D E and revolve in unison therewith, the motion of said pulleys being transmitted by the belts or chains H I to any other operative part of the machine or implement.

In the drawings the interdental spaces of the two counterparts F' G' are shown as being accurately in line with the projections of the clutches F G; but in some cases one counterpart might be at times out of line with the other counterpart. In this event one clutch would engage promptly with its counterpart, while the other clutch would remain inoperative until its counterpart had reached a proper position. At this moment the spring would advance the latter clutch, and thus start the machine as smoothly as though both clutches were operated simultaneously.

To render the machine, vehicle, or implement inoperative, the shaft N is so rocked as to retract the clutches F G, as seen in Fig. 1.

I claim as my invention—

1. The combination, in a clutch mechanism, of a pair of drivers, a pair of independent counter-shafts operated by said drivers, a sliding clutch-box and counterpart clutch on each of said shafts, levers for simultaneously shifting said boxes and disengaging them from their respective counterparts, and a spring attachment that actuates said levers in such a manner as to engage said clutch-boxes with said counterparts, substantially as herein described.

2. The combination, in a clutch mechanism, of main shaft B, drivers $b\ b'$, secured thereto, belts C C', counter-shafts D $d'$ E $e'$, pulleys $d\ e$, secured thereto, sliding clutch-boxes F G, counterpart clutches F' G', pulleys $fg$, pivoted clutch-levers J $j$ K $k$, spring M, rock-shaft N, levers O P, and rods $o\ p$, connecting these levers with said clutch-levers J K, as herein described, and for the purpose stated.

In testimony whereof I affix my signature in presence of two witnesses.

WILLIAM S. KISINGER.

Witnesses:
JAMES H. LAYMAN,
A. W. MCCORMICK.